(12) United States Patent
Martz et al.

(10) Patent No.: US 10,899,163 B2
(45) Date of Patent: Jan. 26, 2021

(54) OPTICAL SECURITY DEVICE

(71) Applicant: ROLIC AG, Zug (CH)

(72) Inventors: Julien Martz, Mulhouse (FR); Hubert Seiberle, Weil am Rhein (DE)

(73) Assignee: ROLIC AG, Zug (CH)

( * ) Notice: Subject to any disclaimer, the term of this patent is extended or adjusted under 35 U.S.C. 154(b) by 309 days.

(21) Appl. No.: 15/571,869

(22) PCT Filed: May 23, 2016

(86) PCT No.: PCT/EP2016/061521
§ 371 (c)(1),
(2) Date: Nov. 6, 2017

(87) PCT Pub. No.: WO2016/188937
PCT Pub. Date: Dec. 1, 2016

(65) Prior Publication Data
US 2018/0093520 A1 Apr. 5, 2018

(30) Foreign Application Priority Data
May 26, 2015 (EP) .................................... 15169104

(51) Int. Cl.
*G02B 5/30* (2006.01)
*G02B 27/28* (2006.01)
(Continued)

(52) U.S. Cl.
CPC ........... *B42D 25/391* (2014.10); *B42D 25/29* (2014.10); *B42D 25/309* (2014.10); *B42D 25/351* (2014.10); *B42D 25/364* (2014.10); *B42D 25/373* (2014.10); *B42D 25/425* (2014.10); *G02B 5/305* (2013.01); *G02B 5/3016* (2013.01); *G02B 5/3083* (2013.01); *G02B 27/286* (2013.01)

(58) Field of Classification Search
CPC ...... G02B 5/3083; G02B 5/04; G02B 5/3033; G02B 5/305; G02B 5/3016; H04N 13/34; H04N 13/337; H04N 13/332; C08L 1/12; C08L 1/14; C08L 67/02
USPC ..................................................... 359/489.07
See application file for complete search history.

(56) References Cited

U.S. PATENT DOCUMENTS 5,793,456 A * 8/1998 Broer .................. G02B 5/3016
349/175
5,882,774 A 3/1999 Jonza et al.
(Continued)

FOREIGN PATENT DOCUMENTS

CN 1550799 A 12/2004
EP 1945465 B1 * 12/2009 ............. B42D 25/29
(Continued)

OTHER PUBLICATIONS

International Search Report of PCT/EP2016/061521 dated Aug. 19, 2016.

*Primary Examiner* — William R Alexander
*Assistant Examiner* — Tamara Y. Washington
(74) *Attorney, Agent, or Firm* — Sughrue Mion, PLLC

(57) ABSTRACT

The invention relates to an optical device comprising two patterned retarders and a reflective polarizer between the retarders. Information which is stored in the pattern of the retarders can be observed both in transmission and reflection. The device according to the invention can be used as high security element, for example for banknotes.

17 Claims, 2 Drawing Sheets

(51) Int. Cl.
  *B42D 25/391* (2014.01)
  *B42D 25/29* (2014.01)
  *B42D 25/351* (2014.01)
  *B42D 25/373* (2014.01)
  *B42D 25/425* (2014.01)
  *B42D 25/309* (2014.01)
  *B42D 25/364* (2014.01)

(56) References Cited

U.S. PATENT DOCUMENTS

| | | | | |
|---|---|---|---|---|
| 6,490,017 | B1* | 12/2002 | Huang | G02B 27/145 |
| | | | | 349/97 |
| 10,385,215 | B2* | 8/2019 | Klein | C09K 19/3861 |
| 2002/0118456 | A1* | 8/2002 | Hasman | G02B 5/3058 |
| | | | | 359/484.04 |
| 2004/0165269 | A1* | 8/2004 | Hasman | G02B 5/1809 |
| | | | | 359/573 |
| 2004/0252259 | A1 | 12/2004 | Schadt et al. | |
| 2006/0115082 | A1* | 6/2006 | Kevenaar | G07D 7/0047 |
| | | | | 380/216 |
| 2010/0047505 | A1* | 2/2010 | Volkening | G11B 7/245 |
| | | | | 428/64.4 |
| 2013/0176566 | A1* | 7/2013 | Mitchell | G03B 35/04 |
| | | | | 356/364 |
| 2014/0103633 | A1* | 4/2014 | Jiang | B42D 25/364 |
| | | | | 283/85 |
| 2017/0058126 | A1* | 3/2017 | Klein | C09K 19/3809 |
| 2017/0139093 | A1* | 5/2017 | Schmitt | G02B 5/3083 |
| 2017/0219825 | A1* | 8/2017 | Benoit | G02C 11/10 |
| 2018/0093520 | A1* | 4/2018 | Martz | B42D 25/309 |
| 2018/0120491 | A1* | 5/2018 | Seiberle | B42D 25/391 |
| 2018/0272789 | A1* | 9/2018 | Genini | G02B 5/3016 |
| 2019/0162889 | A1* | 5/2019 | Delbaere | G02F 1/13363 |

FOREIGN PATENT DOCUMENTS

| | | |
|---|---|---|
| EP | 2 682 791 A1 | 1/2014 |
| JP | 2011-242714 A | 12/2011 |
| WO | 98/52077 A1 | 11/1998 |
| WO | 2007/051529 A1 | 5/2007 |
| WO | 2009/112206 A2 | 9/2009 |

* cited by examiner

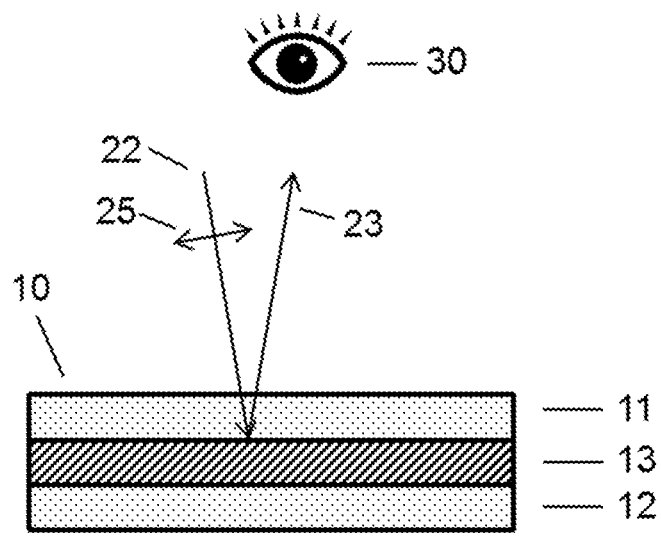
Fig. 3.1
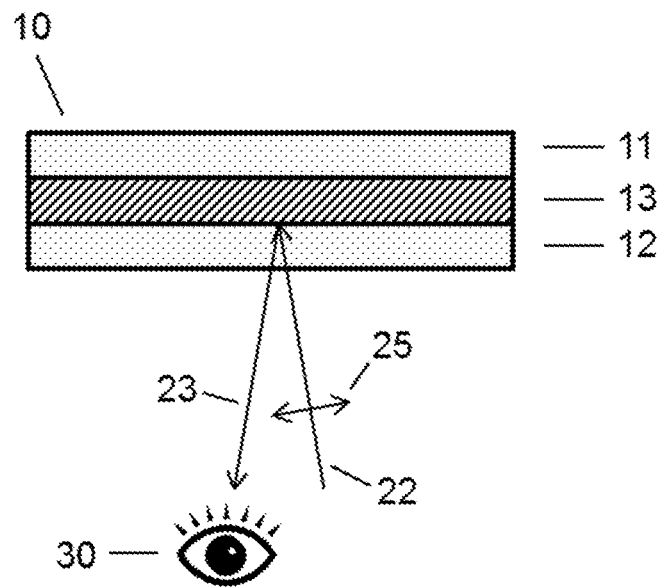
Fig. 3.2

OPTICAL SECURITY DEVICE

CROSS REFERENCE TO RELATED APPLICATIONS

This application is a National Stage of International Application No. PCT/EP2016/061521 filed May 23, 2016, claiming priority based on European Patent Application No. 15169104.5 filed May 26, 2015, the contents of all of which are incorporated herein by reference in their entirety.

TECHNICAL FIELD

The invention relates to a transflective device including two patterned retarders and a reflective polarizer between the retarders. The device according to the invention can be used as high security elements, for example for banknotes.

BACKGROUND OF THE INVENTION

Optical elements with patterned anisotropic properties are, for example, known as optical elements, which include a layer comprising polymerized or cross-linked liquid crystals with locally different optical axes directions. Such layers are, for example, prepared by applying cross-linkable liquid crystal materials on top of an alignment layer exhibiting locally different alignment directions. The liquid crystal material adopts the local alignment direction of the underlying alignment layer and is then cross-linked to fix the orientation.

The anisotropic property may for example refer to the birefringence. A pattern in a layer of a birefringent material is for example characterized by zones of different orientation of the optical axis. As an example, the above mentioned liquid crystal materials are birefringent and an orientation pattern can be achieved by an orientation pattern in an alignment layer.

An alignment layer with locally different alignment directions can easily be prepared by the photo-alignment technique, where a layer of a material, which is sensitive to the polarization of light, is exposed to linearly polarized light. Patterned alignment is achieved by changing the polarization direction of the light for the exposure of different regions of the photo-alignment layer. Detailed methods and suitable materials are, for example, described in WO 2009/112206.

Because of the different refractive indices of birefringent materials, the velocity of light propagating in a birefringent material depends on the polarization direction of the light. If linearly polarized light enters a layer of a birefringent material with the polarization direction not parallel to one of the main axes of the birefringent material, the light is split in two rays with the polarization direction perpendicular to each other, which propagate with two different velocities. The different velocities of the light propagating through the layer causes a retardation of one of the rays against the other and therefore a phase difference results, which increases linearly with the length of the light path through the layer. For a given birefringent material the retardation of light after passing the layer depends linearly on the thickness of the layer. Any retardation can therefore be adjusted by the thickness of the layer, for example, a quarter wave or a half wave retardance.

On the other hand, if linearly polarized light enters a birefringent layer with the polarization direction parallel to a main axis, for example, the optical axis, the polarization state of the light is not changed upon passing the layer. For a birefringent layer having an orientation pattern it is therefore possible to have linearly polarized light incident on the layer, for example, with the polarization direction parallel to the optic axis direction in a first zone and, for example, at 45° to the optic axis direction in a second zone. Accordingly, the polarization state of light is not changed in the first zone but it is changed in the second zone. If half wave retardation is chosen, then the polarization direction of the polarized light passing the layer in the area of the second zone is rotated by 90°. Accordingly, the polarization directions of polarized light passing the second zone differs by 90° from that of the first zone. Hence, if an element with a patterned retarder is properly arranged between crossed linear polarizers, then the light can pass in some areas, whereas in other areas the light is blocked. Because of these properties, optical elements with patterned retarders are used in security devices as the information stored in the form of an orientation pattern cannot be seen under normal conditions but is visible when polarized light that has passed the element is analyzed with a polarizer.

WO 98/52077 discloses an optical device comprising a stack including a first and a second patterned retarder, each encoding optical information, and a polarizer between the retarders. Hence, the device already provides one of the two polarizers required for decoding the information stored in either of the two retarders. If an external polarizer is held below or above the device, then either the first or the second retarder is located between the internal and the external polarizer and the information encoded in the pattern of the corresponding retarder becomes visible. Hence, different information may become visible depending on whether the external polarizer is held below or above the device.

Although state of the art optical elements of the above kind already provide a high level of security for security applications, there is a constant need for novel distinctive features in optical security elements for forgery protection.

SUMMARY OF THE INVENTION

An object of the present invention is, therefore, to provide an optical security device with unique features, which offers a high level of security. A further object is to provide methods for manufacturing such devices.

According to a first aspect of the invention, there is provided an optical security device including a stack comprising a first and a second optical retarder layer each with zonewise different orientation of the optical axis, characterized in that a reflective polarizer is between the two retarders, the polarizing area overlapping at least with a part of each retarder.

The zonewise orientation of the optical axis direction can encode for an image, which can be made visible with polarized light.

Compared to the state of the art device, which comprises a normal polarizer instead of a reflective polarizer, the device according to the invention has the advantage that it can be observed in reflection and in transmission. There are situations, where a device cannot be observed in transmission, for example the device is fixed on a substrate or product which does not allow to observe the device in transmission, but later it is removed from the substrate or product. Then the reflective mode of the device according to the invention makes it still possible to observe the device while it is fixed on the substrate and later it may be observed in transmission.

Preferably, the reflective polarizer is a linear polarizer. Reflective polarizers are known in the art and are for example based on a nano-wire grid or on a multi-layer birefringent polymeric film with alternating birefringent values of the layers. A reflective polarizer based on multi-layer birefringent polymeric film is, for example, commercially available as DBEF-film from 3M and is described for example in U.S. Pat. No. 5,882,774. Preferably, the reflective polarizer in the device according to the invention is a multi-layer birefringent polymeric film, such as DBEF.

In the context of this application the term "image" shall stand for any kind of optical information, for example photographs, text including microtext, numbers, pictures, bar codes, symbols, characters, illustrations and graphics. Preferably, the image represents a photo, preferably a photo of a face, text, numbers or graphics.

The terms encoding and decoding of information refer to the conversion of visible information into an orientation pattern of a retarder and vice versa. For example, an area in the retarder that shall appear dark on observation has a first optical axis direction and an area that shall appear bright has a second optical axis direction. For encoding grey levels, intermediate optical axis directions may be adjusted. Encoding and decoding information in a patterned optical retarder uses methods and materials known in the art, such as layers of cross-linked or polymerized liquid crystal materials which have locally different orientation directions.

An image can only be perceived if it is displayed with an optical contrast. As a prior art example, characters printed with a black ink on a black paper are hardly visible. It is therefore important that the background on which the characters are printed differs optically from the appearance of the characters. If the characters are printed on a white paper, the image that is perceived is black characters on a white background.

On the other hand, text may be printed in white characters with black background on a white paper, for example using an inkjet or laser printer. What is actually printed in this case are not the characters, but the background, which is printed everywhere except of the area of the characters. Even though, what is perceived as optical information is the text. Therefore, in the context of this application an image is considered as one and the same image as long as the only difference is the image contrast. In particular, an image with positive or negative contrast shall be considered as the same image. In different embodiments of the invention an image may appear with positive contrast for a first polarization direction of the external polarizer and with negative contrast for another polarization direction. In such situations the positive and negative contrast images shall be considered as the same image and shall not be confused with the first and third image according to the invention.

In the above example, in which text is printed in black on a white paper the characters can be identified as the optical information and white paper as the background. However, for many images such an assignment cannot be done. For example, if the image is a black and white checkerboard, it is not clear whether the information consists of black squares on a white background or of white squares on a black background. Hence, in the context of this application the term "image" shall be understood to include every part that contributes to the perception of the image, such as in the above examples the characters and the background and the black and white parts of the checkerboard.

BRIEF DESCRIPTION OF THE DRAWINGS

The invention is further illustrated by the accompanying drawing figures. The drawings are examples only and shall help to understand the invention but shall in no way limit the scope of the invention.

FIG. 2 shows the observation of the information encoded in the device in transmission. In FIG. 2.1 the image stored in the pattern of the first retarder layer is visualized by arranging an external polarizer behind the device as seen by an observer. In FIG. 2.2 the image stored in the pattern of the second retarder layer is visualized by arranging an external polarizer in front of the device as seen by an observer.

FIG. 3 shows the observation of the information encoded in the device in reflection. In FIG. 3.1 the observer is adjacent to the first retarder layer and by illuminating the device with polarized light from the side of the observer, the image stored in the first patterned retarder layer is visualized. In FIG. 3.2 the observer is adjacent to the second retarder layer and by illuminating the device with polarized light from the side of the observer, the image stored in the second patterned retarder layer is visualized.

DETAILED DESCRIPTION OF THE INVENTION

Figure 1:
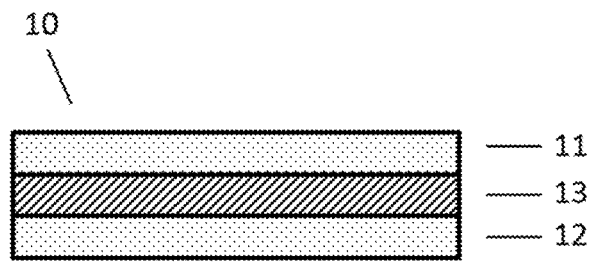
FIG. 1 shows the layer structure of a device according to the invention.
Figure 1:
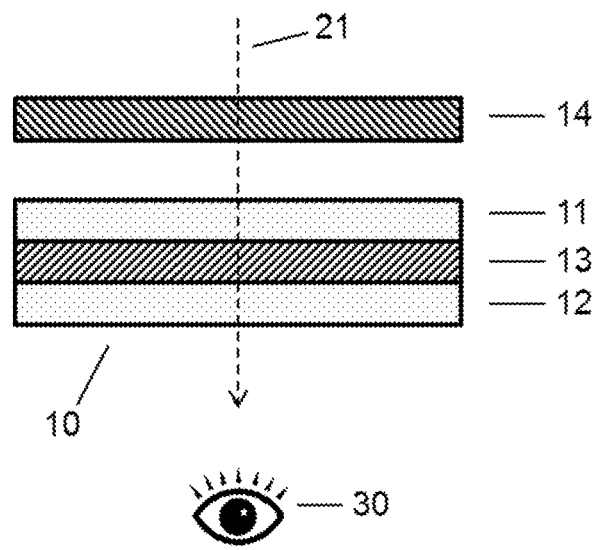
Figure 1:
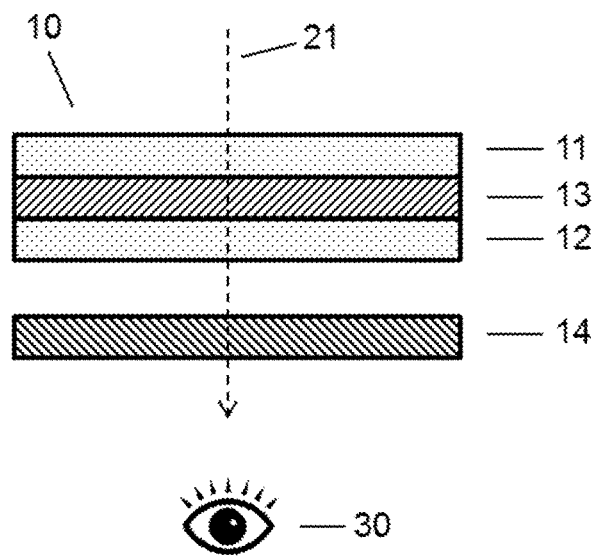

The layer structure of a device 10 according to the invention is shown in FIG. 1. The device comprises a first optical retarder layer 11 with an orientation pattern encoding a first image, a second optical retarder layer 12 with an orientation pattern encoding a second image and a reflective polarizer 13 between the two retarders. Preferably, the reflective polarizer is a linear polarizer. For the following explanation it is assumed that both the reflective polarizer 13 and the external polarizer 14 are linear polarizers.

The first image can be visualized by properly arranging an external polarizer 14 adjacent to the first retarder 11, as shown in FIG. 2.1. The observer 30 is positioned on the opposite side of the device. An observer may be a human or a machine, for example a camera, a scanner or any other optical and/or electro-optical system that is able to detect an image. Incident light 21 from behind the device, as seen by the observer, is polarized by the external polarizer. The polarization state of the light is locally changed on transmission through the retarder 11, depending on the local optical axis direction of the patterned retarder. For the observer, the reflective polarizer 13 acts as a transmissive polarizer and therefore can block the light fully or partially or transmits the light, depending on the local polarization state of the light. Hence the image stored in the retarder 11 becomes visible.

If the external polarizer is arranged between the device and the observer, such that it is adjacent to the patterned retarder 12, as shown in FIG. 2.2, then the incident light 21 is polarized by the reflective polarizer 13, which in this case again acts as a linear polarizer. Depending on the local optical axis directions in retarder layer 12, the polarization state of the light is changed. The polarizer 14 blocks the light fully or partially or transmits the light, depending on the local polarization state of the light. Hence the image stored in the retarder 12 becomes visible.

In both of the above transmissive cases, the external polarizer 14 is preferably arranged with the polarization direction parallel or perpendicular to the polarization direction of the reflective polarizer 13. However, the image becomes also visible for almost every other angle, but the optical contrast of the visualized image may be lower.

It is also possible to use two external polarizers at the same time in order to observe the images stored in the first and the second retarder simultaneously.

Instead of changing the position of the polarizer from front to behind and vice versa it is also possible to rotate the device around an axis through the plane of the device.

In FIG. 3.1 the image stored in the pattern of retarder layer 11 is observed in reflection. The state of polarization of incident polarized light 22, which, for example, has a polarization direction 25 within the drawing plane, is locally changed in retarder layer 11, depending on the local optical axis direction. The reflective polarizer in this case works in reflection and hence acts as an analyzer. Therefore, the intensity of the locally reflected light depends on the change of the local polarization state of the light. After reflection, the polarization state of the still polarized light may further be changed but as there is no additional analyzer, the intensity of the light is not further changed. Hence, the observer 23 can see the visualized image encoded in the pattern of the retarder layer 11.

When the observer is adjacent to the retarder layer 12, as in FIG. 3.1, the image stored in the pattern of retarder layer 12 can be observed in reflection in the same way as described above.

Instead of illuminating the device with polarized light 22, it could also be observed in reflection with incident non-polarized light. In this case the light reflected from the device can be analyzed with an external polarizer, which also makes the stored image visible.

If the angle between the optical axis of the retarder and the polarization direction of the reflective polarizer is 45° and the optical retardation of the retarders is that of a half wave plate, which for green light corresponds to about 280 nm, the brightness is at a maximum. For other values of the optical retardation the brightness is lower, but as the dark state is independent from the optical retardation, an image can be observed for any retardation. Preferably, however, the optical retardation for retarders according to the invention is larger than 100 nm, more preferred larger than 140 nm and most preferred larger than 180 nm. The optical retardation is preferably in the range between 180 and 320 nm, more preferred between 200 to 300 nm and most preferred between 220 and 280 nm. By choosing even larger values of retardation, an optical retarder between two polarizers appears colored. In order to achieve a colored appearance the retardation is preferably larger than 250 nm, more preferred larger than 350 nm and most preferred larger than 450 nm.

A device according to the invention may include additional layers such as alignment layers, protection layers, color filter layers, thin metallic layers, or dielectric layers.

There are technologies, methods and materials known for the production of retarders with patterned orientation. For example, the retarders may include a layer comprising polymerized or cross-linked liquid crystals with locally different optical axes directions. Such layers are, for example, prepared by applying cross-linkable liquid crystal materials on top of an alignment layer exhibiting locally different alignment directions. The liquid crystal material adopts the local alignment directions of the underlying alignment layer and is then cross-linked to fix the orientation. With regard to the preparation of such optical elements reference is made to WO09112206, which is hereby incorporated by reference.

There are different methods that can be used to produce a device according to the invention. Preferably the patterned retarders are made by applying a cross-linkable liquid crystal material, for example by coating, onto a substrate with an aligning surface having the desired orientation pattern. The liquid crystal material adopts the local alignment direction of the underlying aligning surface and is then cross-linked to fix the orientation. The aligning surface may be the surface of an aligning layer. An alignment layer with locally different alignment directions can easily be prepared by the photo-alignment technique, where a layer of a material, which is sensitive to the polarization of light, is exposed to linearly polarized light. Patterned alignment is achieved by changing the polarization direction of the light for the exposure of different regions of the photo-alignment layer. Besides using a photo-alignment layer to provide the orientation pattern for the liquid crystal material, other techniques may be used, such as embossing a structure capable of aligning liquid crystals in the surface of a substrate or a layer on the substrate.

There are different ways to combine the retarders and the reflective polarizer. The patterned retarders may be produced separate from the reflective polarizer. For example, one or both patterned retarders may be produced in the form of a foil which is/are then laminated to the reflective polarizer. If the patterned retarder is produced as a thin layer on a substrate the thin retarder layer may be transferred to the reflective polarizer by, for example, laminating it to the reflective polarizer and then removing the substrate from the retarder. The same process can be used for the combination of the first retarder with the reflective polarizer and for the combination of the second retarder with the reflective polarizer. Preferably, a reflective polarizer film is used as a substrate and at least one of the patterned retarders is prepared by coating or printing a liquid crystal composition onto the reflective polarizer. There may be a separate layer on the polarizer which provides the alignment information for the liquid crystal material. The liquid crystal material adopts the local alignment direction of the underlying alignment layer and is then cross-linked to fix the orientation.

The invention claimed is:

1. An optical security device including a stack comprising a first optical retarder layer with zonewise different orientation of the optical axis, forming an orientation pattern that encodes a first image and a second optical retarder layer with zonewise different orientation of the optical axis, forming an orientation pattern that encodes a second image, characterized in that a reflective polarizer is between the two optical retarder layers, the polarizing area overlapping at least with a part of each optical retarder layer, wherein the reflective polarizer is a linear polarizer and wherein the first image and the second image can be observed in reflection and in transmission.

2. The optical security device according to claim 1, wherein the reflective polarizer is a multi-layer birefringent polymeric film.

3. The optical security device according to claim 1, wherein at least one of the optical retarders includes a layer comprising polymerized or cross-linked liquid crystals with locally different optical axes directions.

4. The optical security device according to claim 3, wherein the layer comprising polymerized or cross-linked liquid crystals is in contact with an aligning surface.

5. The optical security device according to claim 4, wherein the aligning surface is the surface of a photo-alignment layer.

6. The optical security device according to claim 4, wherein the aligning surface is an embossed structure in the surface of the substrate or in a layer on the substrate.

7. The optical security device according to claim 1, wherein the first image and/or the second image comprises at least one of a photograph, a text, a microtext, a number, a picture, a bar code, a symbol, a character, an illustration, a graphic.

8. The optical security device according to claim 1, further comprising at least one of a protection layer, a color filter layer, a thin metallic layer, a dielectric layer.

9. A method of manufacturing the optical security device according to claim 1, comprising the steps producing at least one of the first and second retarders in the form of a foil and laminating the retarder or retarders to the reflective polarizer.

10. A method of manufacturing the optical security device according to claim 1, comprising
producing a first optical retarder layer with zonewise different orientation of the optical axis, forming an orientation pattern that encodes a first image, as a thin layer on a first substrate,
producing a second optical retarder layer with zonewise different orientation of the optical axis, forming an orientation pattern that encodes a second image, as a thin layer on a second substrate,
transferring the first optical retarder layer to a first side of a linear reflective polarizer by laminating it to the linear reflective polarizer,
transferring the second optical retarder layer to an opposite side of the linear reflective polarizer by laminating it to the linear reflective polarizer,
removing the first substrate from the first optical retarder layer, and removing the second substrate from the second optical retarder layer.

11. A method of manufacturing the optical security device according to claim 1, wherein a linear reflective polarizer film is used as a substrate and at least one of the optical retarder layers with zonewise different orientation is prepared by coating or printing a liquid crystal composition onto the linear reflective polarizer film.

12. A method of analyzing the optical security device according to claim 1, comprising arranging an external polarizer between the device and an observer.

13. A method of analyzing the optical security device according to claim 1, comprising arranging an external polarizer behind the device, as seen by an observer.

14. A method of analyzing the optical security device according to claim 1, comprising illuminating the device with polarized light and observing the image without a polarizer in the light path between the device and an observer.

15. A method of analyzing the optical security device according to claim 1, comprising illuminating the device with non-polarized light and observing the device with a polarizer in the light path between the device and an observer.

16. The optical security device according to claim 1, wherein the first and second optical retarder layers have an optical retardation of more than 180 nm.

17. The optical security device according to claim 1, wherein the optical retardation of the first and second optical retarder layers is larger than 350 nm.

* * * * *